No. 846,715. PATENTED MAR. 12, 1907.
E. J. AITKEN.
HORSE HITCH.
APPLICATION FILED SEPT. 19, 1906.
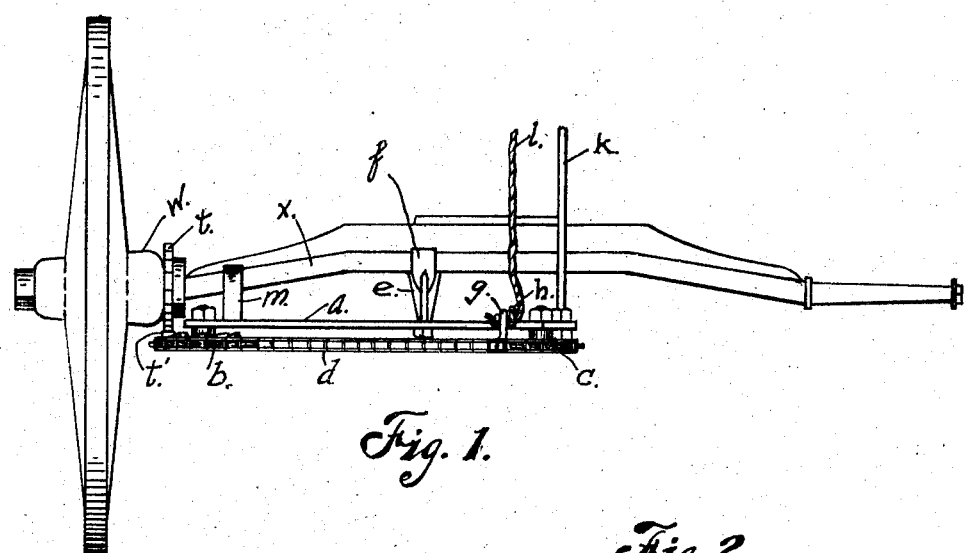
Fig. 1.
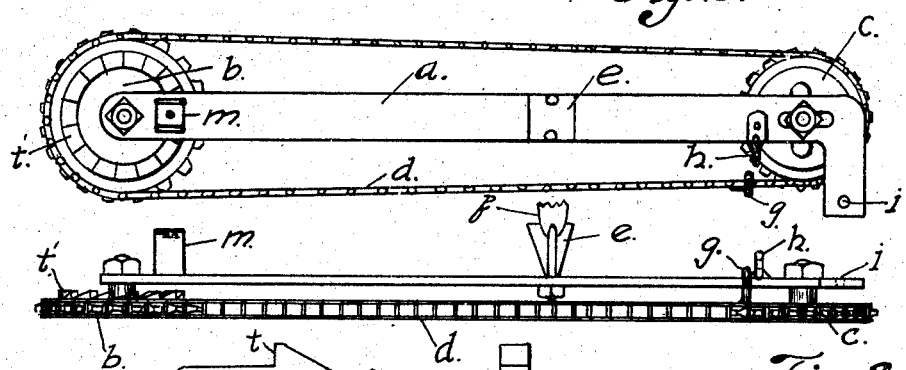
Fig. 2.
Fig. 3.
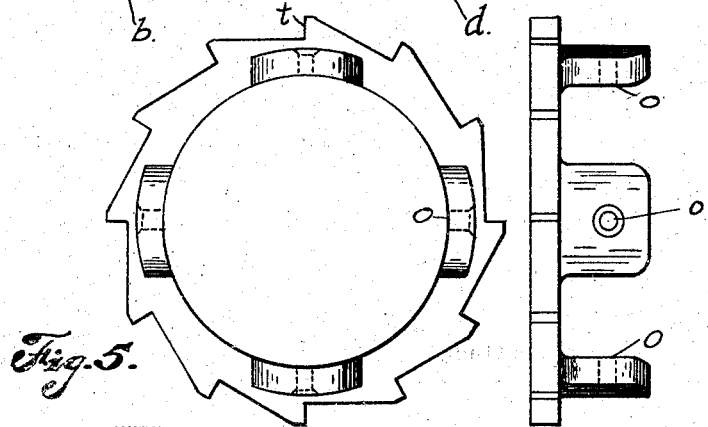
Fig. 5.
Fig. 4.
WITNESSES:
INVENTOR
Edwin J. Aitken

UNITED STATES PATENT OFFICE.

EDWIN J. AITKEN, OF SPOKANE, WASHINGTON.

HORSE-HITCH.

No. 846,715.  Specification of Letters Patent.  Patented March 12, 1907.

Application filed September 19, 1906. Serial No. 335,198.

*To all whom it may concern:*

Be it known that I, EDWIN J. AITKEN, a citizen of the United States, residing at Spokane, county of Spokane, and State of Washington, have invented certain new and useful Improvements in Horse-Hitches, of which the following is a specification.

My invention relates to horse-hitches; and the objects of the same are to operate a simple and inexpensive structure for hitching a horse or preventing the same from running away and which will be applied to a ratchet-wheel located on a hub of a vehicle-wheel and operated in such a manner that when the horse moves the lines are drawn taut. This and other objects are attained by means of the construction illustrated in the accompanying drawings, in which—

Figure 1 is a side view of the machine, showing its application to a vehicle. Fig. 2 is a plan view of the machine. Fig. 3 is a side view of the same; Fig. 4, an end view of ratchet-wheel, and Fig. 5 a side view of the same.

Letter $a$ designates a bar to which the shafts of sprocket-wheels $b$ and $c$ are bolted and having at a point more or less its center a set of holes by which it may be fastened to a vehicle-axle by means of an axle-clip $f$, but separated from direct contact with the axle by a wedge-shaped body $e$, which acts as a fulcrum and which allows the balancing movement of the bar, thus allowing the end with the sprocket-wheel $b$ to raise and engage its teeth $t'$ with the ratchet-wheel teeth $t$ or by a reverse motion to disengage and throw machine out of operation. At the opposite end of $a$ from sprocket-wheel $b$, $a$ is bent at right angles and provided with the means $i$ of fastening to it an operating-bar $k$, which may be operated by the driver from his seat. At a point on $a$ near the sprocket-wheel $c$ is located an eye-plate $h$ for the purpose of guiding a rope or cable by allowing the same to pass freely through the eye.

$m$ is a U-clip, located on $a$ near the sprocket-wheel, and when the machine is in position on a vehicle it straddles the axle or prevents lateral motion of the bar $a$.

$b$ and $c$ are sprocket-wheels, $b$ having on its upper face a number of ratchet-teeth located on a raidus near the outer edge of the wheel, said teeth $t'$ being adapted to engage the teeth $t$ of the ratchet-wheel when the device is in operative position.

$d$ is a sprocket-chain operating on the sprockets $b$ and $c$ and having one special link $g$ to fasten a rope or cable $l$, as shown in Fig. 1.

Figure 5 is a ratchet-wheel having teeth $t$ and when in position is fastened to the inside band of a vehicle-wheel by rivets through holes $o$, driven through the ears of the side of the ratchet-wheel.

$x$ represents an axle of a vehicle and shows the method of attaching the machine.

$k$ is a bar which passes up and through the body of the vehicle to the hand of the driver and serves to throw the machine in or out of gear when moved down or up.

$l$ is a rope or cable attached at one end of the horse's reins and passing through a hole provided in the floor of the vehicle through $h$ and fastened to $g$. Thus when machine is in gear and the vehicle moves ahead the teeth $t$ engage the teeth $t'$ of the sprocket $b$, causing it to revolve and move chain $d$ and draw $g$ toward sprocket $b$, thus pulling line $l$, which would draw in on the reins and stop the horse.

From the foregoing it will be obvious that my hitch is of comparatively simple construction, can be easily fitted to any vehicle, and that as a whole the device is simple and efficient for its use.

Having thus described my invention, what I claim as new, and desire to secure by Letters Patent, is—

In a horse-hitch, a bar having on each end a sprocket-wheel secured by shafts which allow the sprockets to revolve, said sprockets adapted to operate a chain belt having means for fastening a rope or cable to one of its links, one of said sprockets being provided with ratchet-teeth which engage corresponding teeth in a ratchet-wheel secured to the hub of a vehicle-wheel, means carried by the device for attaching it to the axle of a vehicle, a U-clip to prevent a lateral motion of the device when it is in operation, and means for operating the device, substantially as set forth.

In witness whereof I have hereunto set my hand in presence of two subscribing witnesses.

EDWIN J. AITKEN.

Witnesses:
 J. A. COOKE,
 H. E. SMITH.